United States Patent [19]

Regnier et al.

[11] 4,208,868

[45] Jun. 24, 1980

[54] CONTROL DEVICE FOR A STEP-BY-STEP MOTOR

[75] Inventors: Danielle Regnier; Claude Oudet, both of Besancon, France

[73] Assignee: Portescap, La-Chaux-de-Fonds, Switzerland

[21] Appl. No.: 394,473

[22] Filed: Sep. 5, 1973

[30] Foreign Application Priority Data

Sep. 20, 1972 [CH] Switzerland ........................ 13723/72

[51] Int. Cl.[2] ........................ H04K 19/24; G04C 3/00; H02K 37/00

[52] U.S. Cl. ........................................ 368/62; 318/138; 318/430; 318/696; 368/76; 368/28

[58] Field of Search ............... 318/696, 685, 439, 138, 318/432, 454, 139, 440, 138, 430; 328/150; 317/13 R, 36 TD; 58/4 A, 23 BA, 23 D

[56] References Cited

U.S. PATENT DOCUMENTS

| | | | |
|---|---|---|---|
| 1,985,129 | 12/1934 | Wertz | 290/37 X |
| 3,283,236 | 11/1966 | Legg | 317/13 |
| 3,452,263 | 6/1969 | Newell | 318/696 |
| 3,500,103 | 3/1970 | Swain et al. | 318/132 X |
| 3,577,176 | 5/1971 | Kveithen | 318/685 |
| 3,662,245 | 5/1972 | Newell | 318/696 |
| 3,757,193 | 9/1973 | Inaba et al. | 318/696 |
| 3,767,993 | 10/1973 | Yublonski | 318/696 |
| 3,806,781 | 4/1974 | Berney | 318/132 |

*Primary Examiner*—Edith S. Jackmon

*Attorney, Agent, or Firm*—Cushman, Darby & Cushman

[57] ABSTRACT

Device for controlling a monophase rotary step-by-step motor supplying electric control pulses to the winding of the motor, comprising means for detecting the variation of the current passing through the motor winding at each control pulse, this detection means including means of interrupting the control pulse when a minimum appears in the current passing through the winding.

12 Claims, 4 Drawing Figures

CONTROL DEVICE FOR A STEP-BY-STEP MOTOR

The present invention relates to a control device for a monophase rotary step-by-step motor, which supplies electric control pulses to the winding of the motor.

In many applications, in particular in the field of watch-making, the source of power used to control these motors consists of a battery. The aim of the invention is to reduce the motor's electric power consumption and, consequently, to allow the use of a smaller-sized battery, or to extend the life of the battery.

The control pulses for motors of the type mentioned must be of sufficient duration for the rotor to reach, at the end of each pulse, a speed which enables it to overcome the opposing torque and move a step. It has been found that this condition is fulfilled when the induced electromotive force in the winding has reached its maximum (corresponding to maximum rotor speed), which is reflected by a first relative minimum in the current passing through the winding.

Consequently, the control device in accordance with the invention is characterized in that it comprises a device for detecting variations in the current passing through the winding of the motor at the time of each control pulse, this detection device including means of interrupting the control pulse when a minimum appears in the current passing through the winding.

This control device may moreover include means of interrupting the control pulse when a current minimum is not detected in a specific space of time.

In one form of embodiment of this device, the detection device comprises a circuit for shunting the signal representing the current of the motor and means of masking this shunted signal for a space of time determined at the start of each control pulse. The means of interrupting the control pulse may, in this case, be triggered off by a pulse generated by the upward slope of the shunted signal or be triggered off by the crossing of a threshold by this shunted signal.

The attached drawing shows, as an example, a device for controlling the motor of a quartz-crystal watch.

Figure 1:
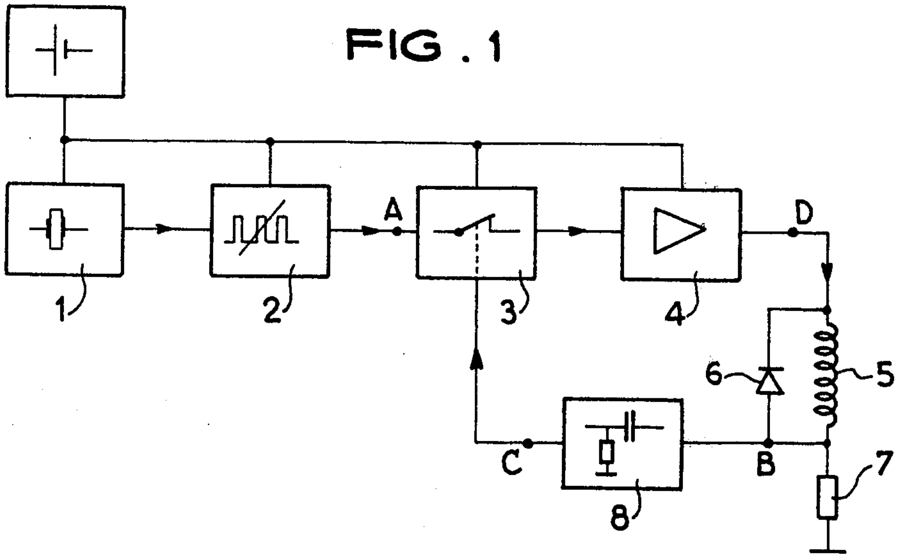
FIG. 1 is a basic diagram of the control device.

In accordance with the diagram of FIG. 1, a quartz oscillator 1 followed by a frequency divider 2, controls, via a detection and cut-off circuit 3 and an output stage 4, the sole coil 5 of a step-by-step motor. The latter drives mechanical display parts of the watch (not shown), i.e. the hands and the calendar mechanism.

In the diagram shown, a protective diode 6 is mounted in parallel with the coil 5. This diode could however be replaced by part of a MOS unit which can constitute the output stage 4. A resistor 7 whose value is low in relation to the ohmic resistance of the coil 5 is connected in series with this coil. The connection point of these latter units is connected to a shunt circuit 8 whose output controls the detection and cut-off circuit 3.

Figure 2:
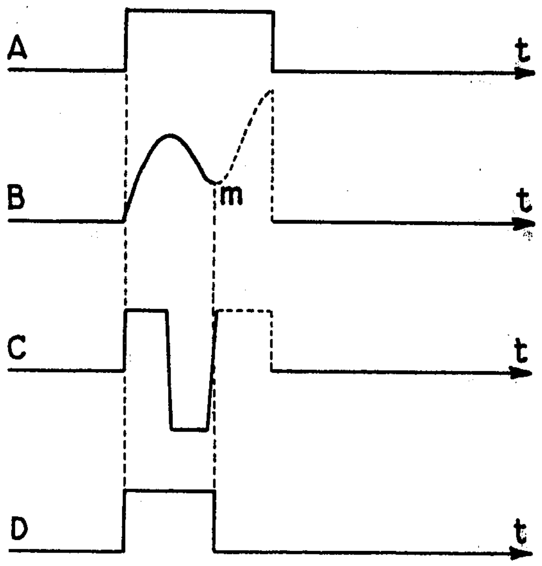
FIG. 2 is a diagram showing the shape of the signals appearing at different points of the device in FIG. 1.

FIG. 2 shows on line A one of the control voltage pulses delivered by the frequency divider 2 at point A in the diagram in FIG. 1. The duration of this pulse is, e.g.

7.8 milliseconds and the frequency of recurrence of the pulses is 1 Hz. The duration of the pulses at A is slightly more than the duration necessary to ensure the simultaneous driving of the hands and of the calendar mechanism which constitutes the motor's maximum load. The latter only occurs once every 24 hours, as driving the hands alone only requires a weaker torque and, consequently, a shorter control pulse duration.

Diagram B in FIG. 2 shows, in solid lines, the variation of the voltage at point B in the diagram in FIG. 1, which voltage is the image of the current passing through the coil 5 of the motor. This current first increases as a function of the circuit's time constant, then the rotor being accelerated, the induced electromotive force in the coil reduces the current and makes it decrease to a minimum m which substantially corresponds with the maximum of the induced electromotive force. At that time, the rotor has acquired sufficient speed to overcome the opposing torque and the voltage pulse to control the motor, produced at point D in FIG. 1, can be interrupted without the correct working of the motor being affected thereby. The control pulse which results is shown in FIG. 2, line D.

If the control pulse, under the same load conditions, were not interrupted at the time of the minimum m of the coil current, this current would again increase as is shown by the part in dotted lines in diagram B in FIG. 2. The power consumed by the motor corresponding to this part in dotted lines is saved by the present device.

The rate of current variation in the motor depends, as already mentioned, besides the time constant of the circuit, on the induced electromotive force which in turn is a function of the load. For a greater load, the minimum m occurs later. Beyond a certain load, the current may have a virtual minimum situated after the end of the control voltage pulses, or this minimum may even disappear. At the outside, in the case of a rotor blockage, the current increases exponentially.

In the present device, means are provided of interrupting the control pulse when the current minimum appears or, in the absence of a minimum, at the end of the 7.8 millisecond pulse supplied by the divider. This latter cut-off could, of course, be done at another specific moment, irrespective of the rate of current.

To detect the current minimum, its image voltage, appearing at point B in the motor circuit, is applied to a shunt circuit 8 which, after amplification and limitation, supplies a signal such as is shown on line C in FIG. 2. IN effect, if the pulse applied to the coil were not interrupted when the minimum appears, the shunted signal appearing at point C would include two positive pulses corresponding to the two current increases. The detection and cut-off circuit 3 is arranged to detect the second upward slope of the shunted signal. For this purpose, the first pulse in this signal is masked by a suitable pulse supplied, e.g., by the frequency divider and the cut-off pulse is produced, by means of a shunt, by said second upward slope of the signal at point C. If no minimum m has been detected, the trailing slope of the 7.8 millisecond pulse, present at point A, is used for the cut-off.

Figure 3:
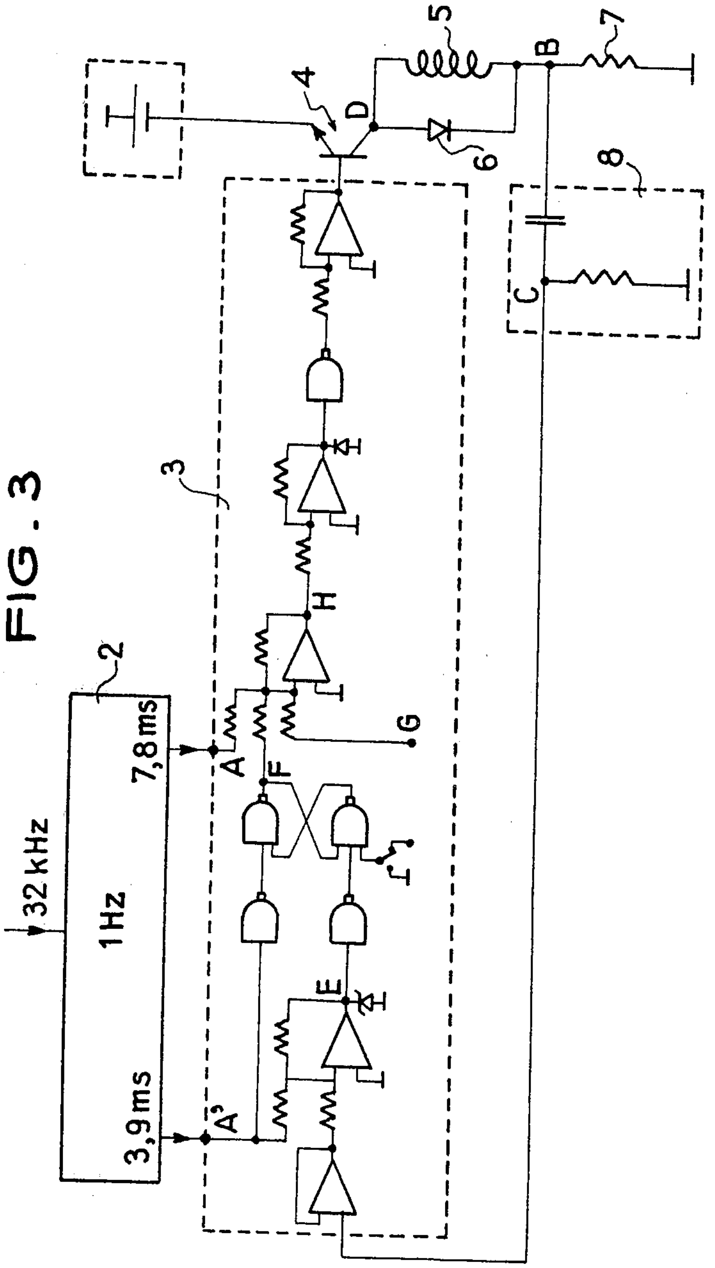
FIG. 3 is a more detailed diagram of a part of a control device similar to the one in FIG. 1.

FIG. 3 shows, in more detail, an example of embodiment of a device similar to the one in FIG. 1. A quartz oscillator (not shown) supplies pulses with a frequency of 32 KHz from which are obtained, by means of the divider 2, two trains of synchronous pulses with a frequency of 1 Hz and respective pulse durations of 7.8 milliseconds (point A) and 3.9 milliseconds (point A').

Figure 4:
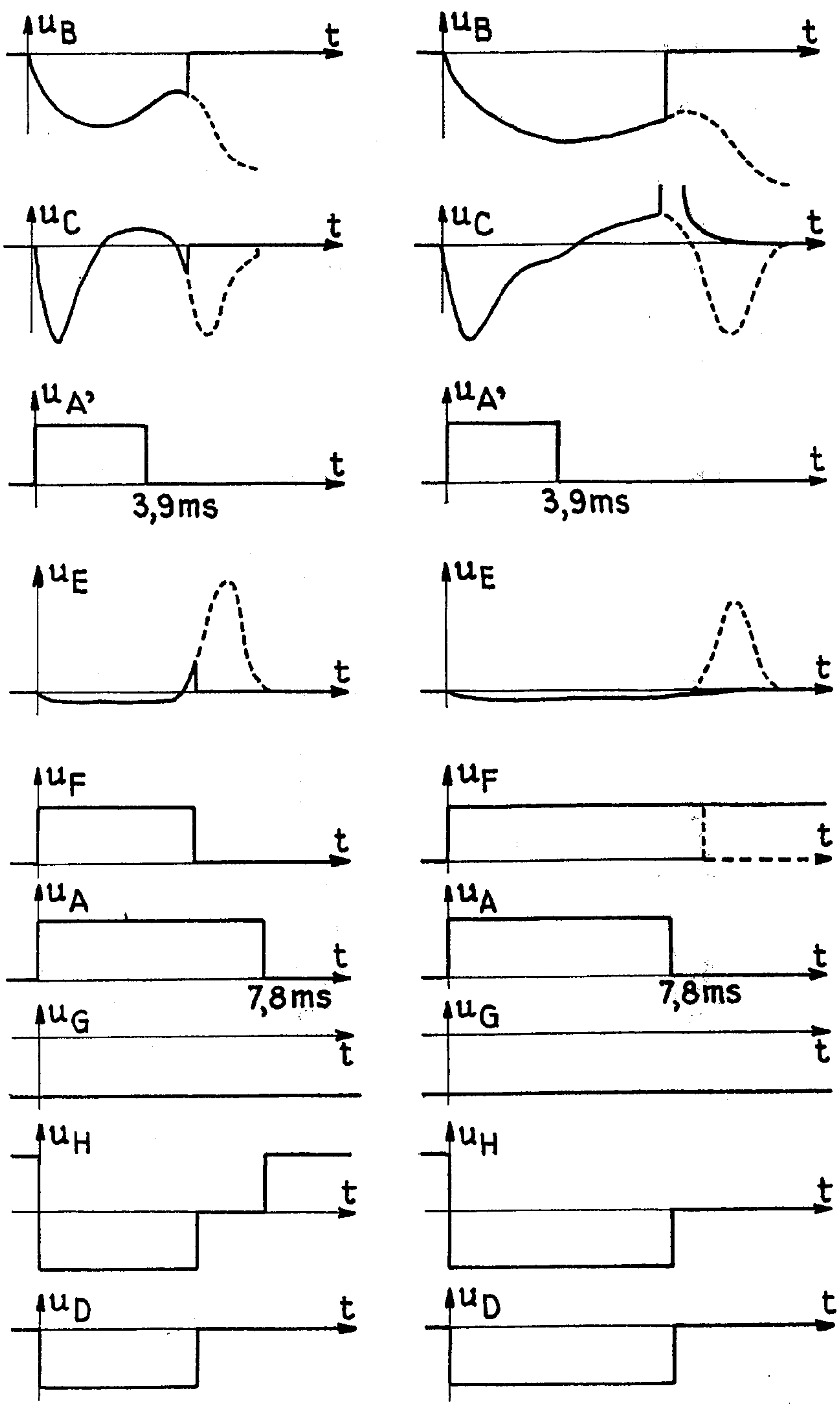
FIG. 4 is a diagram of the signals at different points of the device in FIG. 3.

The detection and cut-off circuit 3 receives, besides these pulses $u_A$ and $u_{A'}$, the voltage $u_C$ appearing at the output C of the shunt circuit 8. The variation as a function of time of the voltage at point B, $u_B$, the image of the current passing through the coil 5, is shown in FIG. 4, on the left in the case of the appearance of a current minimum and on the right in the case where the load is such that the minimum would only occur after the end of the 7.8 millisecond pulse $u_A$. The other diagrams on the left and the right in FIG. 4 show the voltages at different points of the device in each of these two cases. The parts in dotted lines of the curves show how these voltages would evolve in the absence of a cut-off.

Thus, the shunted voltage $u_C$ would comprise two pulses in the same direction the first of which is masked, in the second stage of the detection device, by the pulse $u_{A'}$. The leading slope of the second pulse of $u_C$, shown in dotted lines, produces, at point E in FIG. 3, a cut-off control pulse (diagram $u_E$ on the left, FIG. 4).

In the case where a minimum has been detected, the pulse appearing at point F on the detection circuit 3, therefore has the duration required for the control pulse. The adding of the voltages $u_F$ and $u_A$ and of the constant voltage $u_G$ then causes the appearance at point H of a negative pulse with the duration of $u_F$ which determines the control pulse $u_D$ applied to the motor via the output transistor 4.

In the absence of a minimum during the duration of the pulse $u_A$, the voltage at point F is not returned to zero by a cut-off pulse $u_E$ as shown in diagrams $u_E$ and $u_F$ on the right-hand side of FIG. 4. Consequently, it is a pulse with the same duration as the pulse $u_A$ which appears at the output of the superposition stage at point H and determines the pulse $u_D$. This is the case where the control pulse has the longest permissible duration.

Apart from the examples described, other forms of embodiment of the device can be envisaged to detect a current minimum passing through the winding of the motor. Thus, the image voltage of the current can directly control, by crossing a threshold after passing through a maximum, the means of interrupting the control pulse.

The present control device ensures perfectly correct working of the motor by means of control pulses of variable durations gauged automatically at each step as a function of the effective load. Consequently, this device makes it possible to reduce practically to a minimum the motor's power consumption.

We claim:

1. A control device for a monophase rotary step-by-step motor for supplying electric driving pulses to the winding of the motor, said control device comprising means for generating a sequence of driving pulses on the order of milliseconds in duration and further comprising detection means for detecting the variation of the current passing through the motor winding during each driving pulse, said detection means including means for interrupting the driving pulse when a first relative minimum appears in the current passing through the winding.

2. A control device in accordance with claim 1 including means for interrupting the driving pulse when said first relative current minimum is not detected during a specified period of time.

3. A control device in accordance with claim 1, wherein said detection means comprises a circuit for generating a shunt signal representing the motor current and includes means for masking this shunt signal for a period of time determined at the start of each driving pulse.

4. A control device in accordance with claim 3 wherein said means for interrupting the driving pulse are triggered by a pulse generated by the upward slope of the shunt signal representative of the variation of the current in the winding.

5. A control device in accordance with claim 3 wherein said means for interrupting the driving pulse are triggered by the crossing of a threshold by the shunt signal representing the current in the winding.

6. A control device in accordance with claim 1 wherein said means for interrupting the driving pulse comprises means for generating an image signal which is the image of the current in the winding, and means for triggering said means for interrupting the driving pulse by the crossing of a threshold by the image signal after it has passed through a maximum.

7. An electronic timepiece having a step motor and comprising a quartz crystal vibrator producing a high frequency time standard signal; divider circuit means for producing low frequency time signals in response to said high frequency time standard signals; a gear train driven by said step motor and adapted to place the step motor in one of a loaded and unloaded conditions; load detection means for detecting the condition of the step motor and supplying a signal corresponding thereto; and driving and control means intermediate the dividing circuit and the step motor for receiving the low frequency signals from the dividing circuit and applying same to the step motor for driving same, the signals applied to the step motor being controlled by application of the load detection signal to the driving and control circuit means.

8. An electronic timepiece as depicted in claim 7, wherein the time signals applied to the step motor are controlled by reducing the pulse width of the drive signals upon detection of an unloaded condition.

9. An electronic timepiece as claimed in claim 8, wherein the load detection means is adapted to detect the angle of rotation of the rotor and apply signals corresponding to the angular position of the rotor to the driving and control means.

10. An electronic timepiece as claimed in claim 9, wherein said step motor includes a rotor and said load detection means includes a detecting coil for detecting the angular rotation of the rotor.

11. An electronic timepiece as claimed in claim 10, wherein said driving and control means includes circuit means for receiving the signal detected by the detection coil and using same to gate the low frequency time signals supplied by the divider to thereby reduce the pulse width thereof when the unloaded is detected.

12. An electronic timepiece having a step motor and comprising a quartz crystal vibrator producing a high frequency time standard signal; divider circuit means for producing low frequency time signals in response to said high frequency time standard signals; a gear train driven by said step motor and adapted to place a load on the step motor; load detection means for detecting the load condition of the step motor and supplying a aignal corresponding thereto; and driving and control means intermediate the dividing circuit and the step motor for receiving the low frequency signals from the dividing circuit and applying same to the step motor for driving same, the signals applied to the step motor being controlled by application of the load condition signal to the driving and control means.

* * * * *